United States Patent

Flynn

[15] 3,661,650

[45] May 9, 1872

[54] STORAGE BATTERY WITH CLOSURE SEAL AND VENT MEANS

[72] Inventor: John G. Flynn, New Bedford, Mass.

[73] Assignee: High Energy Processing Corporation, New Bedford, Mass.

[22] Filed: Nov. 6, 1969

[21] Appl. No.: 874,576

[52] U.S. Cl..............................................136/133, 136/178
[51] Int. Cl......................................H01m 1/02, H01m 1/06
[58] Field of Search.........................................136/133, 178

[56] References Cited

UNITED STATES PATENTS

| | | | |
|---|---|---|---|
| 2,790,570 | 4/1957 | Hodges et al. | 136/178 |
| 2,822,416 | 2/1958 | Parkinson | 136/133 |
| 3,415,690 | 12/1968 | Richman | 136/133 |
| 3,440,110 | 4/1969 | Arbter | 136/133 |
| 3,484,301 | 12/1969 | Gray | 136/178 |

FOREIGN PATENTS OR APPLICATIONS 1,423,543  12/1966  France....................................136/178

Primary Examiner—Donald L. Walton
Attorney—Irving Seidman

[57] ABSTRACT

A battery with a closure member sealed in the casing by an annular resilient sealing member. The sealing member has a groove in which the closure member is positioned and an upstanding lip which is crimped over the closure member. A vent valve means is positioned over an opening in the closure member.

2 Claims, 3 Drawing Figures

Patented May 9, 1972 3,661,650
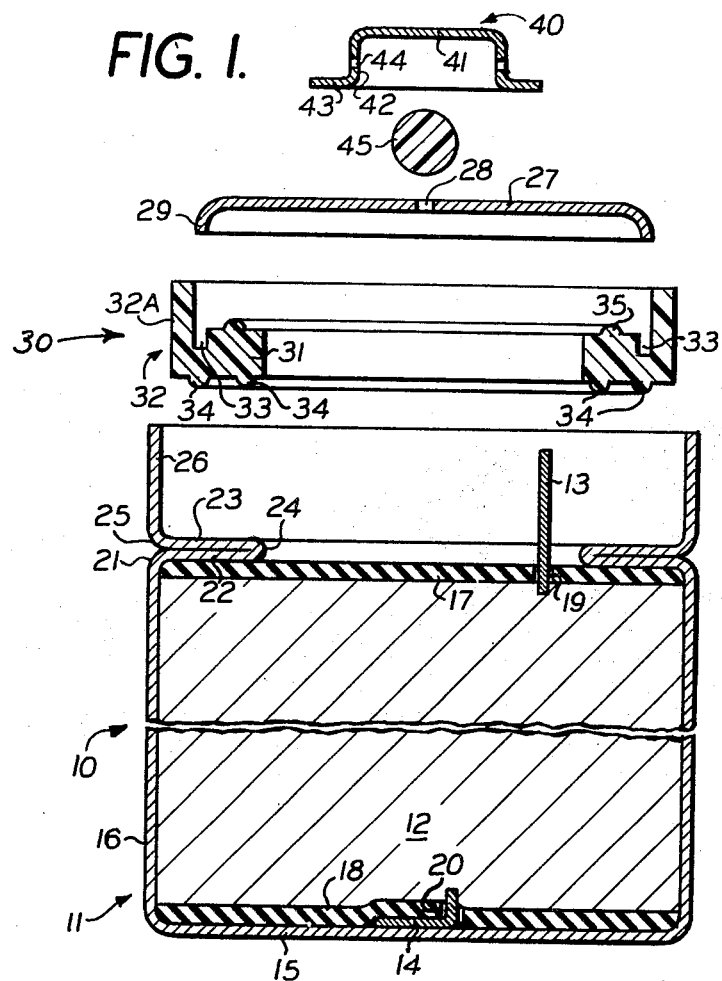
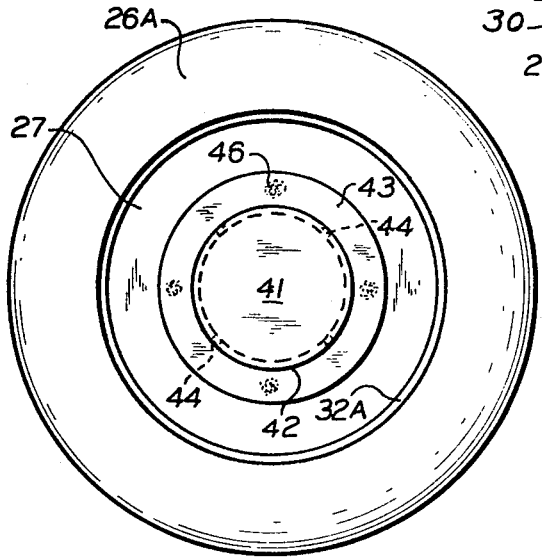
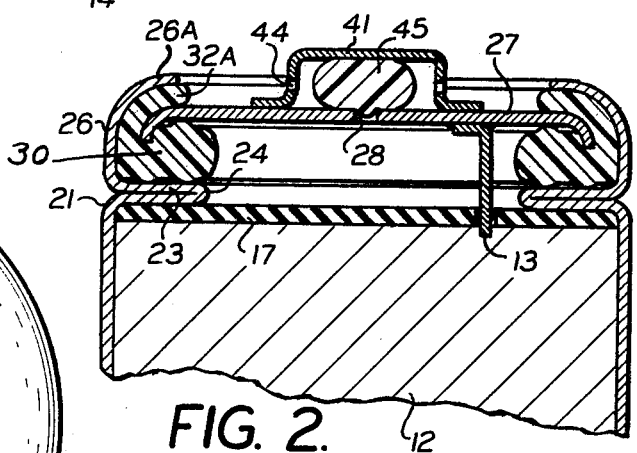
INVENTOR
JOHN G FLYNN
BY
Irving Seidman
ATTORNEY.

STORAGE BATTERY WITH CLOSURE SEAL AND VENT MEANS

BACKGROUND OF THE INVENTION

Inasmuch as storage batteries in their normal usage give rise to the evolution of gases, vent means is provided for passing such evolved gases to the atmosphere. Known vent means take various and sundry structural forms in accordance with the particular usage of the storage battery.

More recently storage batteries of relatively compact type used under extreme and environmental conditions have made demands on the gas vent means which are not met in known vent constructions.

Thus it is vital that the gas vent means used under such indicated conditions shall be of the resealable type wherein the vent means will respond quickly to rapid changes in gas pressure conditions within the battery to insure rapid resealing of the gas vent in the battery.

Accordingly an object of this invention is to provide improved resealable closure means for the gas vents of storage batteries.

A further object of this invention is to provide resealable vent means of the character described which has a rapid response to changes in gas pressures within the storage battery for passing from seal, unseal, and reseal conditions.

Another object of this invention is to provide in a storage battery construction having gas vent means, improved sealing and resealing means for the vent, such means being of a resilient character, and a structure which renders the same proof against attack by gases evolved from the battery and thereby materially extending the working life of such sealing and resealing means.

Still another object of this invention is to provide improved sealing and resealing means for the gas vent of storage batteries wherein such sealing and resealing means is in compact form thereby minimizing the bulk of the structure for mounting the sealing and resealing means in relation to its operative positions in respect to the gas vent of the battery.

Yet another object of this invention is to provide improved gas vent sealing and resealing means of the character described which is of relatively simple construction, economical in cost, and lends itself to rapid and efficient production of storage batteries incorporating the same.

Other objects of this invention will in part be obvious and in part hereinafter pointed out.

BRIEF DESCRIPTION OF THE DRAWINGS

FIG. 1 is an exploded, vertical sectional view showing several elements of a storage battery construction embodying gas vent sealing and resealing means of the instant invention;

FIG. 2 is an enlarged vertical sectional view of the storage battery showing the same in assembled relation to the sealing and resealing means for the vent portion thereof; and FIG. 3 is a top plan view thereof.

DESCRIPTION OF THE PREFERRED EMBODIMENT

As shown in FIG. 1, 10 designates a storage battery construction which embodies sealing and resealing means for a gas vent therein in accordance with the instant invention. Battery 10 comprises a cylindrical container generally indicated at 11, in which is disposed the usual "jelly-roll" type of electrode-dielectric assembly well known in the storage battery art and generally indicated at 12. Such assembly 12 includes the usual metal terminal tabs 13, 14 projecting from the upper and lower ends respectively of the assembly.

The container 11 comprises a circular bottom wall 15 and a cylindrical side wall 16. The assembly 12 is located within container 11, together with dielectric spacer plates 17, 18 at the upper and lower ends respectively thereof. Plates 17, 18 are formed of nylon, polypropylene or the like dielectric material. The plates 17, 18 are perforated as at 19, 20, respectively, to pass the terminal tabs 13, 14, respectively. The cylindrical container wall 16 is crimped radially inward at point 21 which corresponds to the level of the upper dielectric plate 17, to provide a radial inwardly extending portion 22, and then further crimped to provide a radial outwardly extending portion 23 which is in superposed relation to portion 22 and forming a radial inner edge 24. The remaining, upper end portion of cylindrical wall 16 is further bent at point 25 to provide an upstanding terminal wall portion 26.

The resultant open ended container 11 is provided with a circular cover member 27 having a centrally located gas vent opening 28 and a peripheral downwardly extending flange portion 29.

An annular resilient gasket 30 is seated within the upstanding terminal wall portion 26 on radial portion 23; said gasket being adapted to receive the cover 27. Gasket 30, which may be formed of Neoprene or other suitable elastomeric material which is resistant to the action of corrosive chemical liquids and gases, comprises an annular body portion 31 of substantially rectangular cross-section. The gasket 30 further includes an annular portion 32 of L-shaped cross-section which is integral with and disposed outwardly of body portion 31. The juncture of body portion 31 and the portion 32 of L-shaped cross-section defines therebetween an upwardly opening annular groove 33. A pair of laterally spaced annular beads 34 project from the bottom surface of gasket body portion 31 and portion 32, while a single annular bead projects from the top surface of body portion 31.

As shown in FIG. 2, the cover 27 is assembled with gasket 30, which is seated on container portion 23; the cover flange 29 being received in gasket groove 33. The upstanding terminal side wall portion 26 is then crimped radially inward into sealing engagement with the upper end 32A of gasket portion 32, deforming the same into a radial inwardly extending position compressed between the peripheral portion of cover 27 and the terminal edge portion 26A of side wall portion 26, as indicated in FIG. 2.

Valve means is provided for venting the usual gases evolved from the assembly 12 within container 10. To this end, a cylindrical metal cap 40 is provided for overlying the vent opening 28 in container cover 27. Cap 40 includes a top wall 41, a cylindrical side wall 42, and an outwardly extending radial flange 43. The side wall 42 is formed with a plurality of circumferentially spaced vent openings 44.

A resilient valve member 45 of spherical shape is located over vent opening 28 in cover 27 and is retained in a compressed condition by the overlying top wall 41 of cap 40; the normal diameter of valve member 45 being somewhat greater than the distance between cap wall 41 and cover 27. The cap 40 is secured to cover 27 at circumferentially spaced weld points 46 in flange 43 thereof as indicated in FIG. 3.

The normally spherical valve member 45, as shown in FIG. 2, is squeezed to a substantially oblate shape, in its vent sealing condition, thus effectively closing vent opening 28. In such compressed condition the lateral periphery of valve member 45 is spaced somewhat from vent openings 44 in cap 40.

However, when the gas pressure within container 10 exceeds a predetermined value, the resilient valve member 45 is displaced from vent opening 28 sufficiently to allow the evolved gas to pass into cap 40 and to be vented to the atmosphere by way of vent openings 44.

When the gas pressure internally of container 10 is relieved and attains a value less than said predetermined value, the resilient member 45 is operative to rapidly reseal vent opening 28. The venting and resealing operation may be repeated at any intervals of time during the normal usage of battery 10 with efficient venting and resealing operations occurring at all times. Further, the resilient valve member 45, which is also formed of Neoprene or the like, is of a structure such as to withstand the corrosive effects of the evolved gases from electrode assembly 12.

It is understood that in the assembly of the parts forming storage battery 10 that the terminal tabs 13, 14 will be suitably bent and conductively secured to the cover 27 and the container bottom wall 15, respectively, as indicated in FIGS. 1, 2.

The resultant completed storage battery is then used and connected in circuit in a manner well known in the art.

I claim:

1. In a battery having a casing and an electrode-dielectric assembly within said casing, said casing comprising a cylindrical side wall closed at one end and open at the other end, an annular resilient sealing member, said side wall being closed at one end thereof and formed at point adjacent the open end thereof with an annular inwardly directed radial portion for seating said sealing member, said sealing member comprising an annular body portion and an annular lip portion upstanding from said body portion and an annular groove disposed inwardly of said lip portion, a closure member having a downwardly extending peripheral portion received in the groove of said sealing member, the upper annular marginal portion of said casing wall being crimped radially inward to compress the lip and body portions of said sealing member against the seating portion of said side wall and to seal the peripheral portion of the closure member between the lip and body portions of said sealing member, said closure member being formed with a gas vent for passing gas from the interior of said casing outwardly thereof, a resilient valve member overlying the vent in said closure member, and a cap member mounted on the outer surface of said closure member to retain said valve member in place, said cap member being formed with a gas vent for establishing communication with the first mentioned gas vent when said valve member is displaced from said first mentioned gas vent in response to pressures internally of said casing which are in excess of a predetermined gas pressure.

2. A battery as in claim 1 wherein said valve member is of spherical shape having a maximum diameter greater than the distance between opposed surface portions of the top wall portion of said cap member and said closure member, while the maximum diameter of said valve member is less then the inner diameter of the annular side wall portion of said cap member.

* * * * *

PO-1050
(5/69)

UNITED STATES PATENT OFFICE
CERTIFICATE OF CORRECTION

Patent No. 3,661,650    Dated May 9, 1972

Inventor(s) JOHN G. FLYNN

It is certified that error appears in the above-identified patent and that said Letters Patent are hereby corrected as shown below:

on the Title Page, the date of the patent noted in item [45] is to be corrected by changing "1872" to -- 1972 --.

Signed and sealed this 19th day of September 1972.

(SEAL)
Attest:

EDWARD M. FLETCHER, JR.
Attesting Officer

ROBERT GOTTSCHALK
Commissioner of Patents